(12) United States Patent
Mori et al.

(10) Patent No.: US 11,501,552 B2
(45) Date of Patent: Nov. 15, 2022

(54) CONTROL APPARATUS, INFORMATION PROCESSING SYSTEM, CONTROL METHOD, AND PROGRAM

(71) Applicant: Sony Interactive Entertainment Inc., Tokyo (JP)

(72) Inventors: Hideki Mori, Tokyo (JP); Yasushi Okumura, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 52 days.

(21) Appl. No.: 16/603,115

(22) PCT Filed: Apr. 27, 2017

(86) PCT No.: PCT/JP2017/016770
§ 371 (c)(1),
(2) Date: Oct. 4, 2019

(87) PCT Pub. No.: WO2018/198272
PCT Pub. Date: Nov. 1, 2018

(65) Prior Publication Data
US 2021/0117663 A1 Apr. 22, 2021

(51) Int. Cl.
*G06K 9/00* (2022.01)
*G06V 40/10* (2022.01)
(52) U.S. Cl.
CPC .................................. *G06V 40/107* (2022.01)
(58) Field of Classification Search
CPC .. G06K 9/00375; G06V 40/107; G06F 3/014; G06F 3/017; G06F 3/01; G06T 5/002;
(Continued)

(56) References Cited

U.S. PATENT DOCUMENTS

| 6,704,694 B1 | 3/2004 | Basdogan |
| 6,861,945 B2 | 3/2005 | Kim |

(Continued)

FOREIGN PATENT DOCUMENTS

| EP | 2323022 A2 | 5/2011 |
| EP | 2613223 A1 | 7/2013 |

(Continued)

OTHER PUBLICATIONS

Extended European Search Report for corresponding EP Application No. 17759600.4, 16 pages, dated Oct. 18, 2019.

(Continued)

*Primary Examiner* — Stephen P Coleman
(74) *Attorney, Agent, or Firm* — Matthew B. Dernier, Esq.

(57) ABSTRACT

Provided is a control apparatus that receives information regarding a motion of user's fingers and information regarding a shape of user's hands, generates first pose information indicative of a pose of user's hands in accordance with the received information regarding the motion of user's fingers, generates second pose information indicative of a pose of user's hands in accordance with the received information regarding the shape of user's hands, combines the generated first pose information with the generated second pose information in accordance with criteria based on a predetermined condition, and generates and outputs information indicative of the pose of user's hands.

10 Claims, 4 Drawing Sheets

(58) Field of Classification Search
CPC .................. G06T 5/20; G06T 7/0002; G06T 2207/20024; G06T 2207/30168; H04N 5/23212; H04N 5/232935; H04N 5/772; H04N 5/232122; H04N 5/232127; H04N 5/36961
USPC ........................................................ 382/103
See application file for complete search history.

(56) References Cited

U.S. PATENT DOCUMENTS

| | | | |
|---|---|---|---|
| 8,323,106 | B2 | 12/2012 | Zalewski |
| 9,245,177 | B2 | 1/2016 | Perez |
| 9,477,310 | B2 | 10/2016 | Cherradi El Fadili |
| 10,274,992 | B2 | 4/2019 | Ito |
| 10,391,400 | B1 | 8/2019 | Mucha |
| 10,635,171 | B2 | 4/2020 | Nakamura |
| 2002/0084982 | A1 | 7/2002 | Rosenberg |
| 2003/0234823 | A1 | 12/2003 | Sato |
| 2004/0032346 | A1 | 2/2004 | Kim |
| 2005/0179644 | A1 | 8/2005 | Alsio |
| 2005/0219355 | A1 | 10/2005 | Tahara |
| 2007/0075966 | A1 | 4/2007 | Daniel |
| 2007/0085157 | A1 | 4/2007 | Fadell |
| 2008/0261693 | A1 | 10/2008 | Zalewski |
| 2011/0269544 | A1 | 11/2011 | Daniel |
| 2011/0298827 | A1 | 12/2011 | Perez |
| 2012/0249417 | A1 | 10/2012 | Hyeon |
| 2012/0308140 | A1 | 12/2012 | Ambrus |
| 2013/0207890 | A1 | 8/2013 | Young |
| 2014/0324611 | A1* | 10/2014 | Burkhart ............ G06Q 30/0268 705/21 |
| 2015/0042580 | A1* | 2/2015 | Shim .................... G06F 3/042 345/173 |
| 2015/0258431 | A1 | 9/2015 | Stafford |
| 2015/0290494 | A1 | 10/2015 | King |
| 2016/0006854 | A1 | 1/2016 | Aizawa |
| 2016/0054797 | A1 | 2/2016 | Tokubo |
| 2016/0132124 | A1 | 5/2016 | Nakamura |
| 2017/0235364 | A1 | 8/2017 | Nakamura |
| 2017/0308118 | A1 | 10/2017 | Ito |
| 2017/0308165 | A1 | 10/2017 | Erivantcev |
| 2017/0344113 | A1 | 11/2017 | Grierson |
| 2018/0067545 | A1 | 3/2018 | Provancher |
| 2018/0161670 | A1 | 6/2018 | Boev |
| 2020/0209966 | A1 | 7/2020 | Nakamura |

FOREIGN PATENT DOCUMENTS

| | | | | |
|---|---|---|---|---|
| EP | 2796965 | A2 | 10/2014 | |
| JP | 11195140 | A | 7/1999 | |
| JP | 2004078966 | A | 3/2004 | |
| JP | 2009042796 | A | 2/2009 | |
| JP | 2010064155 | A * | 3/2010 | |
| JP | 2011524048 | A | 8/2011 | |
| JP | 2011238068 | A | 11/2011 | |
| JP | 2012175282 | A | 9/2012 | |
| JP | 2013533537 | A | 8/2013 | |
| JP | 2013242652 | A | 12/2013 | |
| JP | 2015228115 | A | 12/2015 | |
| JP | 2017075465 | A | 4/2017 | |
| WO | 2012170349 | A2 | 12/2012 | |
| WO | 2015015843 | A1 | 2/2015 | |
| WO | 2016038953 | A1 | 3/2016 | |
| WO | WO-2016038953 | A1 * | 3/2016 | ............ G06F 3/014 |
| WO | 2016076376 | A1 | 5/2016 | |
| WO | 2018175419 | A1 | 9/2018 | |

OTHER PUBLICATIONS

Amato N M et al., "A Generalized Framework for Interactive Dynamic Stimulation for MultiRigid Bodies" IEEE Transactions on Systems, Man and Cybernetics, Part B: Cybernetics. vol. 34, No. 2, pp. 912-924 (Apr. 1, 2004).
International Preliminary Report on Patentability and Written Opinion for corresponding PCT Application No. PCT/JP2017/004764, 11 pages, dated Sep. 13, 2018.
International Search Report for related Application PCT/JP2017/037375, 4 pages, dated Dec. 19, 2017.
International Preliminary Report on Patentability and Written Opinion for related PCT Application No. PCT/JP2017/037732, 13 pages, dated May 9, 2019.
International Preliminary Report on Patentability and Written Opinion for corresponding PCT Application No. PCT/JP2017/037375, 11 pages, dated Apr. 30, 2020.
Extended European Search Report, corresponding EP Application 17906974.5, 7 pages, dated Nov. 10, 2020.
International Preliminary Report on Patentability and Written Opinion for corresponding PCT Application No. PCT/JP2017/016770, 16 pages, dated Nov. 7, 2019.
International Search Report for corresponding PCT Application No. PCT/JP2017/004764, 4 pages, dated Apr. 18, 2017.
"[TGS 2015] Yoso Ijo no "Sude Kankaku" ni Odoroki. VR Kukan ni Access suru Shin Device 'Oculus Touch' Taiken Report", [online], 7 pages, [retrieval date Apr. 11, 2017 (Apr. 11, 2017)], Internet, <URL: http://www.4gamer.net/games/195/G019528/20150919032/> (Sep. 19, 2015) (for relevancy see International Search Report for corresponding PCT Application No. PCT/JP2017/004764, 4 pages, dated Apr. 18, 2017 cited above).
Supplementary Search Report for corresponding EP Application No. 17759600.4, 16 pages, dated Sep. 10, 2019.
International Search Report for corresponding Application PCT/JP2017/016770, 4 pages, dated Jul. 18, 2017.
Decision to Grant a Patent for corresponding JP Application 2019-548799, 5 pages, dated Jan. 4, 2021.

* cited by examiner (a)　　　　　　　　　　(b)

(a)

(b)

CONTROL APPARATUS, INFORMATION PROCESSING SYSTEM, CONTROL METHOD, AND PROGRAM

TECHNICAL FIELD

The present invention relates to a control apparatus, an information processing system, a control method, and a program.

BACKGROUND ART

In recent years, virtual reality (VR) devices for generating and presenting a virtual space image are in widespread use. The virtual reality devices detect an actual motion of hands and fingers of a user, and reflect the detected motion in the motion of an object in a virtual space.

For such processing, in the past, a camera or other device for detecting the user's hands has been used to capture an image of the user's hands, recognize the shape of the user's hands, and detect whether user's fingers are bent or extended.

SUMMARY

Technical Problem

However, the above-mentioned existing device that uses a camera for detecting the user's hands is unable to recognize the shape of the user's fingers and detect the status of the user's fingers in a case where the user is in a posture where the user's fingers are invisible from the position of the camera and in a case where the user's hands are outside the field of view of the camera.

The present invention has been made in view of the above circumstances. An object of the present invention is to provide a control apparatus, an information processing system, a control method, and a program that make it possible to increase the opportunity of detecting a pose of user's hands.

Solution to Problem

In order to solve the above conventional problem, there is provided a control apparatus including reception means, first pose information generation means, second pose information generation means, and pose information output means. The reception means receives information regarding a motion of user's fingers and information regarding a shape of user's hands. The first pose information generation means generates first pose information indicative of a pose of user's hands in accordance with the received information regarding the motion of user's fingers. The second pose information generation means generates second pose information indicative of a pose of user's hands in accordance with the received information regarding the shape of user's hands. The pose information output means combines the generated first pose information with the generated second pose information in accordance with criteria based on a predetermined condition, and generates and outputs information indicative of the pose of the user's hands.

Advantageous Effect of Invention

The present technology makes it possible to increase the opportunity of detecting a pose of user's hands.

DESCRIPTION OF EMBODIMENT

Figure 1:
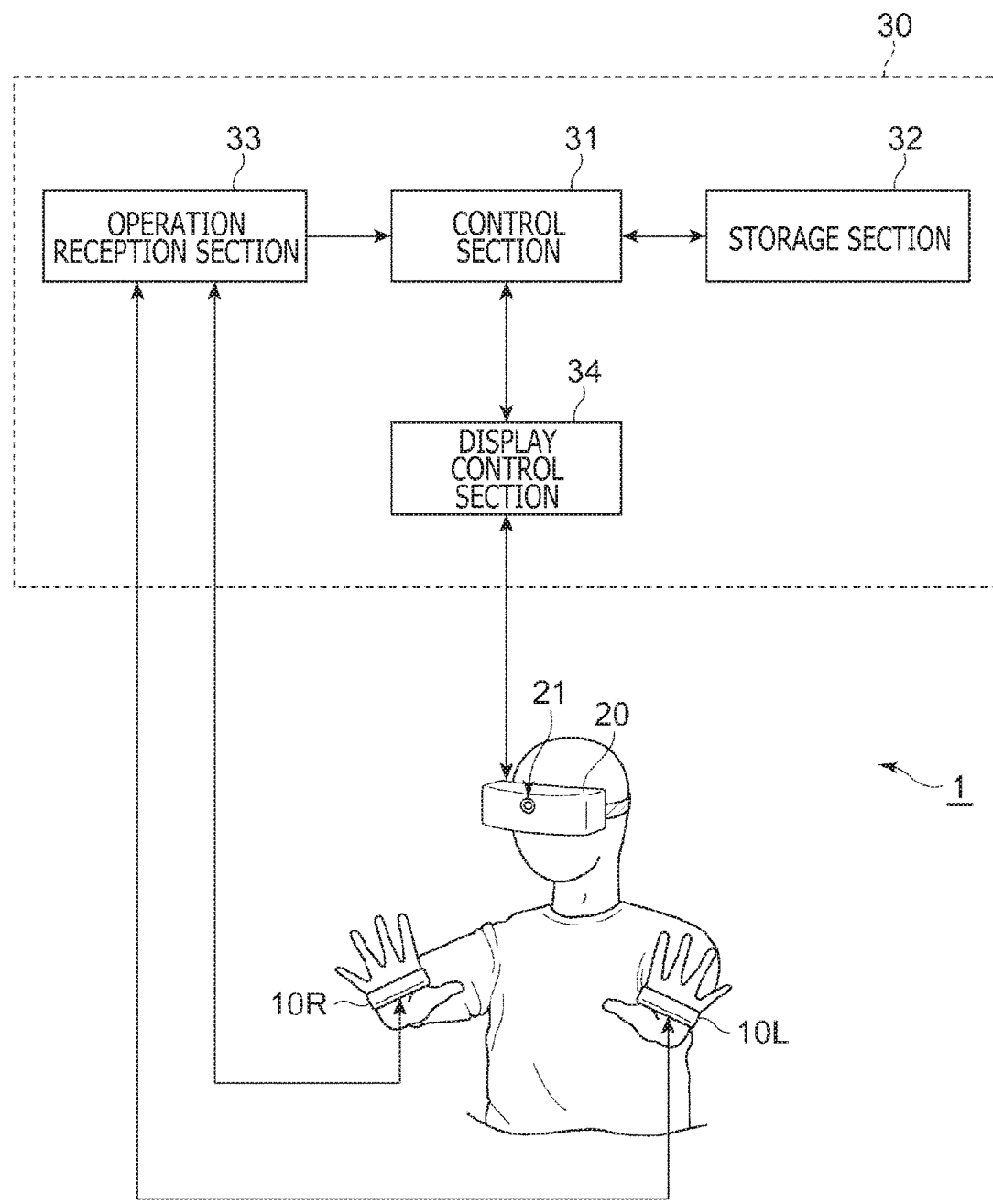
FIG. 1 is a schematic block diagram illustrating an exemplary configuration of an information processing system according to an exemplary embodiment of the present invention.

An embodiment of the present invention will now be described with reference to the accompanying drawings. As illustrated in FIG. 1, an information processing system 1 according to an embodiment of the present invention includes operating devices 10L and 10R (hereinafter referred to as the operating device 10 when these operating devices need not be distinguished from each other), a display device 20, and a control apparatus 30. The operating devices 10L and 10R are respectively mounted to the left and right hands of a user. The display device 20 is mounted to the head of the user. The control apparatus 30 is communicatively connected in a wired or wireless manner to the operating devices 10 and the display device 20.

As schematically illustrated in FIG. 1, the control apparatus 30 includes a control section 31, a storage section 32, an operation reception section 33, and a display control section 34.

Figure 2:
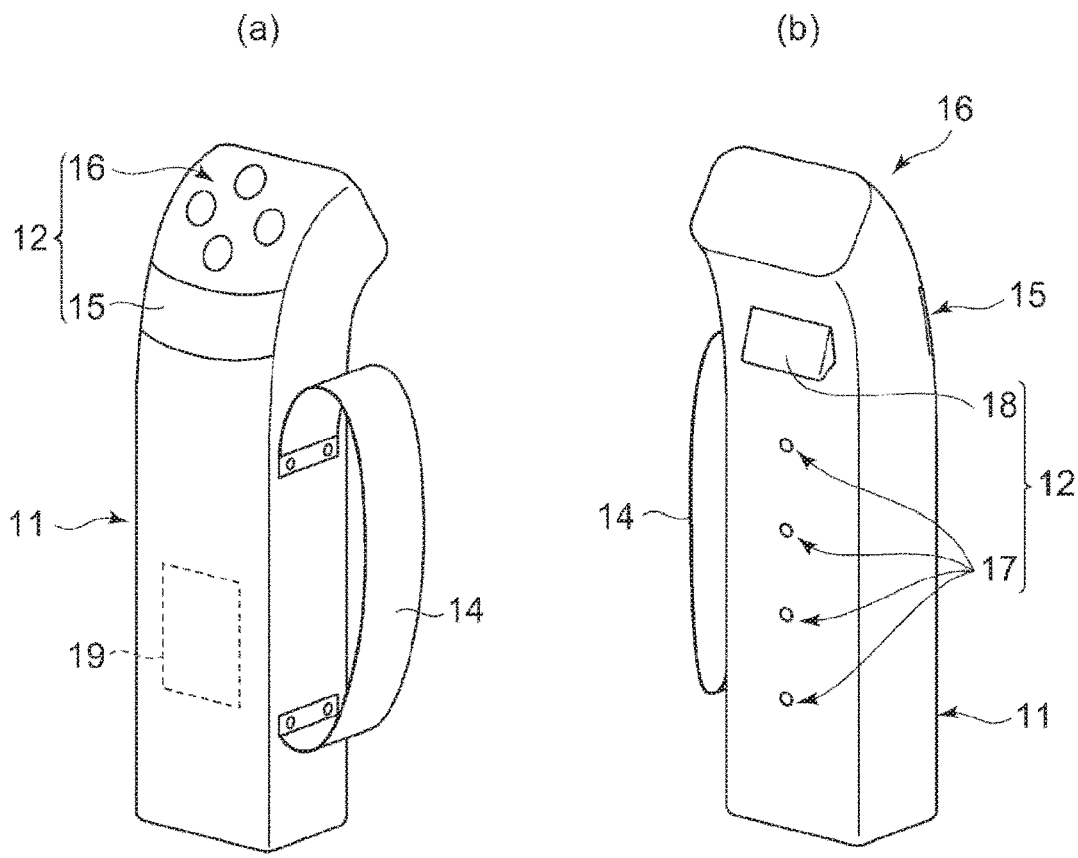
FIG. 2 depicts schematic perspective views illustrating an example of an operating device used in the information processing system according to an exemplary embodiment of the present invention.

The operating device 10 includes a grip section 11 and an operating section 12, as illustrated, for example, in FIG. 2. The front view of the operating device 10 is presented at (a) in FIG. 2, and the rear view is presented at (b) in FIG. 2. The grip section 11 is substantially shaped like a polygonal column. The operating section 12 is formed continuously from the grip section 11. In the example of FIG. 2, the operating section 12 includes a sensor section 15 and a button operation section 16 on the front side, and includes finger sensors 17 and a button 18 on the rear side. Further, the operating device 10 contains a control circuit 19.

The control circuit 19 includes a program control device such as a microcomputer, and operates in accordance with a program stored in storage means such as a memory. Further, the control circuit 19 is connected to the sensor section 15, the button operation section 16, the finger sensors 17, and the button 18 of the operating section 12, receives various signals such as user finger detection results and operation indication signals, for example, from the sensor section 15 and the button operation section 16, and transmits the received signals to the control apparatus 30. The control circuit 19 includes, for example, a wireless communication interface such as a Bluetooth (registered trademark) interface or a wired communication interface such as a universal serial bus (USB) or wired local area network (LAN) interface, and transmits and receives various signals to and from the control apparatus 30 through the wireless communication interface or the wired communication interface.

Further, in the present embodiment, a retainer 14 is secured to the left or right side of the operating device 10. The retainer 14 is, for example, a ring-shaped flexible belt. When operating the operating device 10 depicted in the present example, the user threads four fingers other than the thumb through the retainer 14 and brings the main body of the operating device 10 into contact with the base of the thumb. The example in FIG. 2 assumes that the operating device 10 is retained by pressing the right side of the operating device 10 to the palm of a user's hand. Moreover, the operating device 10 is sized so that the end of the user's thumb reaches the button operation section 16 on the front of the operating device 10 when the user holding the operating device 10 by threading his/her fingers through the retainer 14 naturally grips the operating device 10. That is, the present embodiment is configured so that, for example, at least some buttons in the operating section 12, including the button 18, are disposed within the reach of user's fingers when the user grips the grip section 11.

More specifically, when the user holding the operating device 10 naturally grips the operating device 10, the index finger of the user comes into contact with the button 18 on the operating device 10, and the user grips the grip section 11 by using the palm, the middle finger, the ring finger, and the little finger of the user's hand. It is needless to say that even when the user opens his/her hand in this state, the operating device 10 does not fall off because the retainer 14 secures the operating device 10 to the user's hand.

The sensor section 15 is disposed at a position that is slightly lower than the position reached by the end of the user's thumb and close to the base of the user's thumb when the user naturally grips the operating device 10. The sensor section 15 is able to achieve detection over a relatively wide angular range that is toward the front of the operating device 10, centered along the normal direction of the surface of the operating device 10, and extended from the left side of the front of the operating device 10 to the right side. The sensor section 15 detects the user's thumb within such an angular range. The sensor section 15 then detects the position where the user's thumb is detected (an angle within the above-mentioned angular range) and the distance between the sensor section 15 and the user's thumb, and outputs detection result information, including the information regarding the above detected position and distance, to the control circuit 19. The sensor section 15 may be anything such as a camera, an optical sensor, a pyroelectric sensor, or a capacitive sensor.

Further, the finger sensors 17 are disposed at positions that are respectively reached by the user's index finger, middle finger, ring finger, and little finger when the user naturally grips the operating device 10. The finger sensors 17 are, for example, capacitive sensors that generate information indicative of whether the fingers are in proximity. Each of the finger sensors 17 generates information indicative of whether a finger is in proximity, and outputs the generated information to the control circuit 19. In the present exemplary embodiment, the operating device 10 implements a first detection apparatus according to the present invention.

The display device 20 is, for example, a head-mounted display (HMD) that is to be mounted on the head of the user. The display device 20 wiredly or wirelessly receives image data outputted from the control apparatus 30, and displays the received image data to present it to the user. In an example of the present embodiment, the display device 20 may include a left-eye image display section and a right-eye image display section. The left-eye image display section presents an image to the left eye of the user, and the right-eye image display section presents an image to the right eye of the user. The left- and right-eye image display sections may each include a display element such as an organic electroluminescence (EL) display panel or a liquid-crystal display panel. In the above case, the control apparatus 30 generates and outputs left-eye image data and right-eye image data that are to be displayed by the respective image display sections. In this case, the display device 20 causes the left-eye image display section to output the left-eye image data for display purposes, and causes the right-eye image display section to output the right-eye image data for display purposes.

In the present embodiment, the display device 20 may be either a non-transparent display apparatus or a transparent display apparatus. The non-transparent display apparatus does not allow a user mounting it to view the outside world. The transparent display apparatus allows the user mounting it to view an image obtained by combining an outside world image with an image to be displayed.

Further, a camera 21 is included in an example of the present embodiment. The field of view of the camera 21 is in the forward direction from the display device 20 (in the forward direction from the face of the user when the user mounts the display device 20). The camera 21 repeatedly captures an image within a predetermined field of view (FOV) forward of the user, and sequentially outputs image data derived from the captured image to the control apparatus 30.

The control section 31 of the control apparatus 30 is a program control device such as a central processing unit (CPU), and operates in accordance with a program stored in the storage section 32. In the present embodiment, the control section 31 receives information transmitted from the operating device 10. Further, the control section 31 receives image data transmitted from the display device 20. When a captured image of a hand of the user is included in the received image data, the control section 31 performs a process of detecting the shape of the hand. That is, in the present example of the present embodiment, the display device 20 and the control section 31 implement a second detection apparatus.

Furthermore, the control section 31 generates first pose information indicative of the pose of a user's hand in accordance with information regarding the motion of user's fingers that is detected by the operating device 10 (the information in the present example includes information indicative of whether or not user's fingers other than the thumb are bent in contact with the operating device 10 and information regarding the position of and the distance to the thumb). Additionally, the control section 31 generates second pose information indicative of the pose of a user's hand in accordance with information regarding the shape of a user's hand that is detected from the image data transmitted from the display device 20.

The control section 31 generates information indicative of the pose of a user's hand by combining the first pose information and the second pose information, which are generated as described above, in accordance with criteria based on a predetermined condition, and outputs the generated information. As an example, the control section 31 selects either the first pose information or the second pose information under a predetermined condition, and outputs the selected pose information as the information indicative of the pose of a user's hand.

Moreover, the control section 31 performs processing on an application such as a game, generates image data to be displayed by the display device 20 in accordance with the processing, and outputs the generated image data to the display device 20. The operation of the control section 31 will be described in detail later.

The storage section 32 is, for example, a disk device or a memory device, and stores a program to be executed by the control section 31. The program may be supplied on a computer-readable, non-transitory recording medium such as a digital versatile disc-read-only memory (DVD-ROM), and stored in the storage section 32. Further, the storage section 32 operates as a work memory of the control section 31.

The operation reception section 33 wiredly or wirelessly communicates with the operating device 10. Further, the operation reception section 33 receives information regarding a user operation and information regarding the motion of user's fingers, the information outputted by the operating device 10. Then, the operation reception section 33 outputs received information to the control section 31.

The display control section 34 wiredly or wirelessly communicates with the display device 20, and transmits, to the display device 20, image data outputted from the control section 31. Further, the display control section 34 receives image data captured by the camera 21 on the display device 20, the image data outputted from the display device 20. Then, the display control section 34 outputs the received image data to the control section 31.

Figure 3:
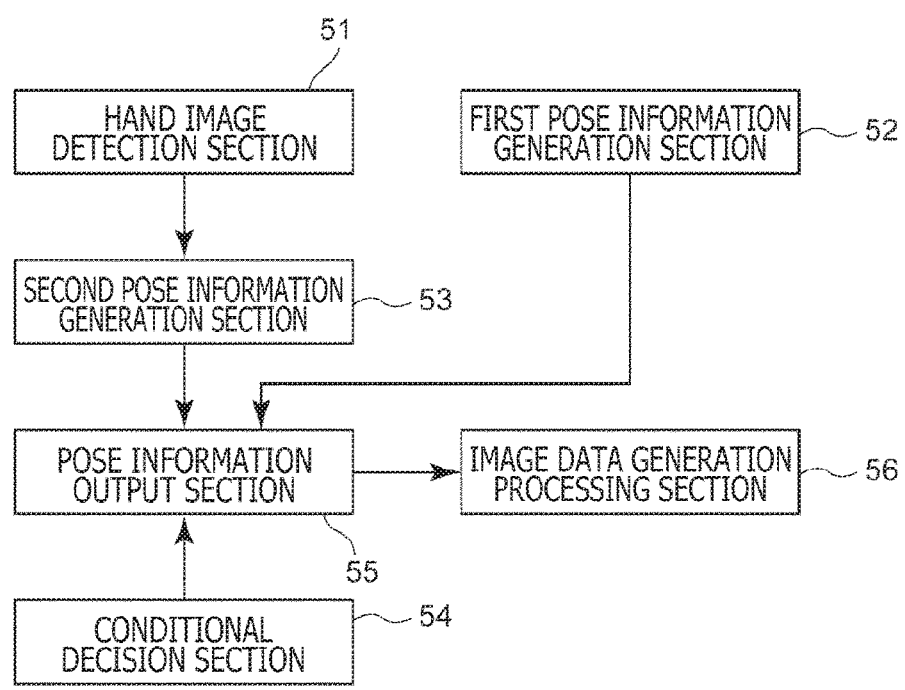
FIG. 3 is a functional block diagram illustrating an example of a control apparatus included in the information processing system according to an exemplary embodiment of the present invention.

The operation of the control section 31 in the control apparatus 30 will now be described. In a certain example of the present embodiment, the control section 31 functionally includes, as illustrated in FIG. 3, a hand image detection section 51, a first pose information generation section 52, a second pose information generation section 53, a conditional decision section 54, a pose information output section 55, and an image data generation processing section 56.

The hand image detection section 51 sequentially receives inputted image data successively captured by the camera 21 on the display device 20, and regards each of the image data as a processing target. If the image data regarded as a processing target includes a captured image of a user's hand, the hand image detection section 51 performs a process of detecting the shape of the user's hand. More specifically, the hand image detection section 51 detects, from the image data captured by the camera 21 on the display device 20, a range where a user's left hand is imaged and a range where a user's right hand is imaged. If a user's hand is imaged, the hand image detection section 51 generates information indicative of the positions of finger joints of the user's hand and the reliability of the detection. For example, from a predetermined skeleton model of a human hand and an image of a hand included the image data regarded as a processing target, the hand image detection section 51 generates information indicative of how the finger joints of the skeleton model are bent (e.g., the angles and directions of such finger joint bending), estimates the shape of the user's hand from the skeleton model, and generates information indicative of the positions of the finger joints and the reliability of the detection.

As regards the fingers of a user's hand that is not imaged and included in the image data regarded as a processing target, the hand image detection section 51 may output information indicating that the positions of finger joints are unknown. Even when a finger of a user's hand is partially hidden, for example, by the back of the user's hand in the image data captured by the camera 21 on the display device 20, the hand image detection section 51 assumes that the joint positions of the finger remain unchanged, and estimates and outputs the joint positions of the hidden finger in the image data regarded as a processing target as far as the hidden finger is imaged and included in the image data that is captured immediately before the earlier-mentioned captured image data and received from the display device 20. This processing will not be described in detail here because it can be accomplished by performing a widely known process.

The first pose information generation section 52 generates the first pose information indicative of the pose of a user's hand in accordance with the information regarding the motion of user's fingers that is received from the operating device 10 (the information in the present example includes information indicative of whether or not user's fingers other the thumb are bent in contact with the operating device 10 and information regarding the position of and the distance to the thumb). More specifically, the first pose information generation section 52 generates the first pose information that indicates whether each of the user's fingers is extended or bent. For example, in a case where the user's thumb is positioned close to the sensor section 15 of the operating device 10 (i.e., brought into contact with the housing of the operating device 10), the finger sensors 17 for detecting the user's index finger, middle finger, and ring finger have not detected that the associated fingers are in proximity, and the finger sensor 17 for detecting the user's little finger has detected that the associated finger is in proximity, the first pose information generation section 52 generates the first pose information indicating that the fingers of the user's hand are in the following states:

Thumb: Bent
Index finger: Extended
Middle finger: Extended
Ring finger: Extended
Little finger: Bent In a case where, as mentioned later, the second pose information uses numerical values to express the degree of joint bending (the degree of finger openness), namely, uses the value "1.0" to express a state where a finger is extended and uses the value "0.0" to express a state where a finger is bent to the limit, the first pose information generation section 52 may accordingly generate the first pose information in the form of a numerical value. However, in a case where the finger sensors 17 of the operating device 10 are allowed to use a two-level decision method of determining whether a finger is bent or extended, the first pose information generation section 52 merely outputs either the value "1.0" indicative of a state where a finger is extended or the value "0.0" indicative of a state where a finger is bent to the limit. For instance, in the case of the preceding example, the first pose information generation section 52 generates the following first pose information:

Thumb: 0.0
Index finger: 1.0
Middle finger: 1.0
Ring finger: 1.0
Little finger: 0.0

Based on information that is generated by the hand image detection section 51 to indicate, for example, the positions of finger joints and the position and direction of the palm of a hand (the normal direction of the palm of a hand), the second pose information generation section 53 determines whether each of the user's fingers is extended or bent. In a certain example of the present embodiment, from the information generated by the hand image detection section 51, which indicates, for example, the positions of finger joints and the position of the palm of a hand, the second pose information generation section 53 generates the second pose information indicating whether the individual fingers are extended or bent, namely, the degree to which each finger is bent. More specifically, in a case where the second pose information generation section 53 has determined that the user has formed the so-called letter V by extending the user's index finger and middle finger and moderately bending the other fingers, the second pose information generation section 53 generates the following information (information indicative of the degree of openness of each finger) as the second pose information:
Thumb: 0.2
Index finger: 1.0
Middle finger: 1.0
Ring finger: 0.2
Little finger: 0.1
In the above case, the ratio of bending is expressed by using numerical values, namely, the value "1" indicative of a state where a finger is extended and the value "0" indicative of a state where a finger is bent to the limit.

Further, in a case where the information outputted from the hand image detection section 51 indicates that the joint positions of a certain finger are unknown, the second pose information generation section 53 outputs information indicating that whether the finger is extended or bent is unknown (e.g., outputs a negative value).

As mentioned earlier, even if a user's finger is partially hidden in the last image data received from the display device 20 in a case where information indicative of the relevant joint positions is already outputted from the hand image detection section 51 in accordance with information regarding the earlier image data, the second pose information generation section 53 generates the second pose information based on the already outputted information.

The conditional decision section 54 determines whether or not a predetermined condition is satisfied. More specifically, an exemplary predetermined condition includes a condition based on whether or not a user's hand is included within the field of view of the camera 21 on the display device 20, that is, the condition whether or not the fingers of a user's hand are imaged and included in the image data captured by the camera 21 on the display device 20.

Figure 4:
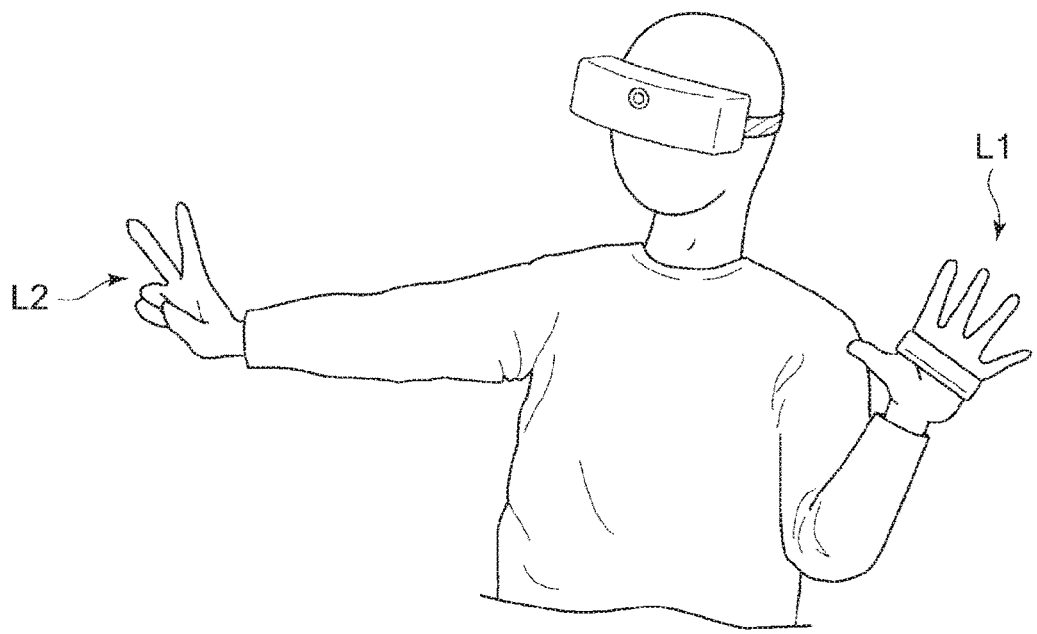
FIG. 4 depicts diagrams illustrating a user hand detection operation performed by the information processing system according to an exemplary embodiment of the present invention.
Figure 4:
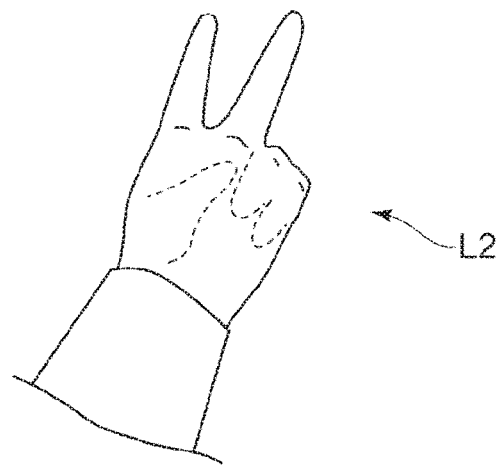

In a certain example of the present embodiment, the hand image detection section 51 detects, from the image data captured by the camera 21 on the display device 20, a range where a user's left hand is imaged and a range where a user's right hand is imaged. Further, when performing a process of detecting the fingers of the hands, the hand image detection section 51 performs a process of enumerating imaged fingers. This processing will not be described in detail here because it can be accomplished by using a widely known method. A situation where the fingers of a user's hand are not imaged and included in the image data captured by the camera 21 on the display device 20 is encountered in a case where the user's hand L1 is entirely outside the field of view of the camera 21 on the display device 20 as illustrated, for example, at (a) in FIG. 4. However, such a situation is not limited to the above case. More specifically, a situation where at least a part of a user's hand L2 is hidden, for example, by the palm of the user's hand L2 although the user's hand L2 is included within the field of view of the camera 21 on the display device 20 as illustrated at (b) in FIG. 4 is also included in a case where the fingers of a user's hand are not imaged and included in the image data captured by the camera 21 on the display device 20 (a case where the user's fingers are not included within the field of view of the camera 21 on the display device 20). It should be noted that the hidden fingers of the user's hand L2 are virtually marked by broken lines at (b) in FIG. 4 for purposes of explanation.

The conditional decision section 54 enumerates the fingers included in the image data captured by the camera 21 on the display device 20 as described above, concludes that the condition is satisfied by imaged fingers and not satisfied by non-imaged fingers, and outputs information indicative of whether or not the condition is satisfied by each of the fingers.

The pose information output section 55 combines the first pose information outputted from the first pose information generation section 52 with the second pose information outputted from the second pose information generation section 53 in accordance with criteria defined by the information outputted from the conditional decision section 54, and then generates and outputs information indicative of a pose of a user's hand. As mentioned earlier, the pose information output section 55 references the information outputted from the conditional decision section 54, selects either the first pose information or the second pose information, and outputs the selected pose information as the information indicative of the pose of a user's hand. In an example of the present embodiment, this selection is made on an individual finger basis.

More specifically, the pose information output section 55 references a condition outputted from the conditional decision section 54 to indicate whether or not a finger is imaged and included in the image data captured by the camera 21 on the display device 20. As regards a finger that is imaged and included in the image data captured by the camera 21 on the display device 20, the pose information output section 55 selects and outputs information regarding the finger, which is included in the second pose information outputted from the second pose information generation section 53. As regards a finger that is not imaged and included in the image data captured by the camera 21 on the display device 20, the pose information output section 55 selects and outputs information regarding the finger, which is included in the first pose information outputted from the first pose information generation section 52.

As an example, let us assume a case where the user looking forward moves a user's left hand behind a user's head and thrusts a user's right hand forward so as to form the letter V with the index finger and middle finger of the user. In this case, as regards the left hand, the conditional decision section 54 outputs information indicating that none of the fingers are imaged and included in the image data captured by the camera 21 on the display device 20 (information indicative of whether or not the condition is satisfied). As regards the right hand, as illustrated at (b) in FIG. 4, the conditional decision section 54 outputs information indicating that the thumb, the ring finger, and the little finger are not imaged and included in the image data captured by the camera 21 on the display device 20, and outputs information indicating that the index finger and the middle finger are imaged and included in the image data captured by the camera 21 on the display device 20.

However, even in the above case, information indicative of the position of each joint of the thumb, the ring finger, and the little finger of the right hand could be outputted in accordance with the last image data captured by the camera 21 on the display device 20. Therefore, the second pose information includes information indicative of whether the thumb, the ring finger, and the little finger are bent or extended.

Based on the information regarding a condition outputted from the conditional decision section 54, the pose information output section 55 outputs information regarding each finger of the left hand that is included in the first pose information, outputs information regarding the index finger and middle finger of the right hand that is included in the second pose information, and outputs information regarding the other fingers of the right hand that is included in the first pose information.

The image data generation processing section 56 uses the information outputted from the pose information output section 55 in order to generate image data to be displayed on the display device 20. The generated image data may represent, for example, an image of a hand of a virtual character. The image data generation processing section 56 determines the shape of the hand of the virtual character (information indicative of whether each finger is bent or extended) in accordance with the pose information outputted from the pose information output section 55, disposes the character within a predetermined field of view (e.g., within the same field of view as that of the camera 21 on the display device 20), and performs rendering to generate the image data. The processing performed by the image data generation processing section 56 will not be described in detail here because it can be accomplished by performing a widely known process.

Operation

The information processing system 1 according to an embodiment of the present invention has the above-described configuration and operates, for example, as described below. In the following example, it is assumed that the control apparatus 30 executes a paint program as an application program for drawing an image in accordance with user instructions within a virtual three-dimensional space (virtual space). It is assumed that the control apparatus 30, which operates in accordance with the paint program, sequentially disposes balls having designated colors along the motion trajectory of fingertips of a user's right hand (a motion trajectory in the virtual space that corresponds to the motion trajectory of the fingertips of the user's right hand in a real space) while at least one finger of a user's left hand is bent. It is also assumed that the radius of each ball increases with an increase in the number of extended right-hand fingers. Further, it is assumed that the control apparatus 30, which operates in accordance with the paint program, displays a color selection menu and prompts the user to select a color when all the fingers of the user's left hand are determined to be extended. While the user is prompted to select a color, the control apparatus 30 does not perform a process of disposing the balls having designated colors along the motion trajectory of the fingertips of the user's right hand.

In the above example of the present embodiment, the user mounts the operating devices 10L and 10R to the left and right hands of the user, respectively. In the following example, it is assumed that drawing is performed while the fingers of the user's right hand are aligned and extended. In general, the user mainly gazes at the fingertips of the user's right hand during drawing. It is therefore assumed that the camera 21 on the display device 20 captures an image of the user's right hand. In this instance, the user's left hand may be outside the field of view of the camera 21 on the display device 20.

Figure 5:
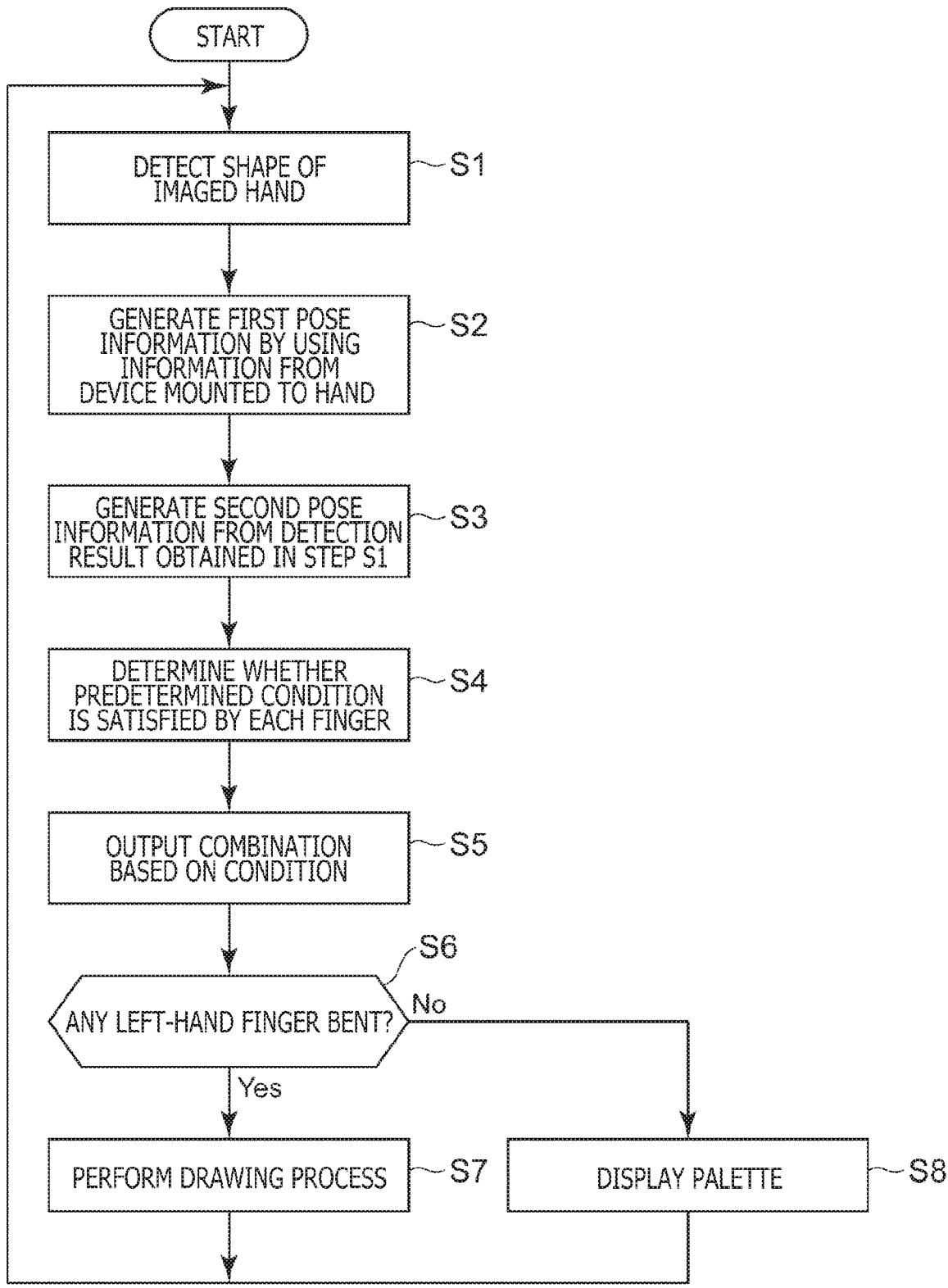
FIG. 5 is a flowchart illustrating an exemplary process performed by the information processing system according to an exemplary embodiment of the present invention.

As illustrated in FIG. 5, the control apparatus 30 performs a process of detecting the shape of the user's right hand that is included in the image data captured by the camera 21 on the display device 20 (S1). The control apparatus 30 generates information indicative of the joint positions of each finger of the user's right hand (indicative of corresponding coordinates in the virtual space).

Based on information regarding the motion of user's fingers, which is received respectively from the operating devices 10L and 10R, the control apparatus 30 generates the first pose information indicative of the pose of the left and right hands of the user (S2).

Further, the control apparatus 30 uses the information generated in step S1 to determine whether each finger of the user's right hand, which is included in the image data captured by the camera 21 on the display device 20, is extended or bent, and generates the second pose information that is the information indicative of whether each finger is extended or bent (S3). The information generated in step S3 by the control apparatus 30 indicates that whether the fingers of the user's left hand are bent or extended is unknown.

The control apparatus 30 determines whether or not a condition is satisfied the fingers of the user's left and right hands, that is, whether or not the fingers of the user's left and right hands are imaged and included in the image data captured by the camera 21 on the display device 20 (S4). In this instance, as mentioned earlier, the fingers of the user's right hand are imaged, and the fingers of the user's left hand are not imaged. Therefore, the control apparatus 30 determines that the condition is satisfied by the fingers of the user's right hand, namely, the right-hand fingers from the thumb to the little finger, and determines that the condition is not satisfied by the fingers of the user's left hand, namely, the left-hand fingers from the thumb to the little finger.

The control apparatus 30 then references a condition indicative of whether or not the fingers are imaged and included in the image data captured by the camera 21 on the display device 20. As regards a finger imaged and included in the image data captured by the camera 21 on the display device 20, the control apparatus 30 selects and outputs the information regarding the finger that is generated in step S3 and included in the second pose information. As regards a finger not imaged and included in the image data captured by the camera 21 on the display device 20, the control apparatus 30 selects and outputs the information regarding the finger that is generated in step S2 and included in the first pose information (S5: combination output based on condition).

Stated differently, in the above example, the information generated in step S3 to indicate whether each finger is extended or bent is outputted as is for all the fingers of the user's right hand from the thumb to the little finger, and the information generated in step S2 to indicate whether each finger is extended or bent is outputted as is for all the fingers of the user's left hand from the thumb to the little finger.

Here, the control apparatus 30 determines whether or not an output is generated to indicate that one of the fingers of the user's left hand is bent (S6). If the generated output indicates that one of the fingers is bent ("YES" at S6), the control apparatus 30 does not display a color selection menu. As all the fingers (five fingers) of the user's right hand are extended, the control apparatus 30 draws a ball having a radius corresponding to a state where the five fingers are extended and having the last-selected color (or a predetermined default color to be used when no color is selected) around the fingertip position, for example, of the index finger (S7: drawing process). The control apparatus 30 then returns to step S1 and continues with the processing.

Meanwhile, if it is determined in step S6 that all the left-hand fingers are extended ("NO" at S6), the control apparatus 30 outputs a color selection screen to the display device 20 and prompts the user to select a color (S8: palette display). When the user selects a color here, the control apparatus 30 performs setup so as to use the selected color for the next drawing, returns to step S1, and continues with the processing.

As described above, as regards a fingertip of a hand that is gazed at, the present embodiment uses an image captured, for example, by the camera 21 on the display device 20 in order to decide whether a finger is bent or extended, and as regards a finger that is not imaged by the camera 21, the present embodiment causes a device mounted to a hand to decide whether a finger is bent or extended.

As mentioned earlier, when the pose of a hand is determined based on image data, the shape of the skeleton of the hand can be estimated. Therefore, the degree to which a finger is bent can be determined numerically and minutely. Meanwhile, when, for example, the finger sensors 17 of the operating device 10, which include, for example, a capacitive sensor, are used, proximity or apartness can be determined by not more than two or three levels. That is, the second pose information based on image data generally makes it possible to estimate the shape of a hand more minutely than the first pose information.

In the present example of the present embodiment, the second pose information is generated based on the image data acquired by the camera 21 on the display device 20. Therefore, the position of a fingertip that the user gazes at can be determined with relatively high accuracy. Meanwhile, the position of a fingertip outside the field of view of the user is determined based, for example, on the finger sensors 17 of the operating device 10. Therefore, although such determination is made with relatively low accuracy, the pose of a hand can be estimated.

Examples of Modified Combination

The foregoing description assumes that, based on the condition whether or not each of the user's fingers is imaged and included in the image data captured by the camera 21 on the display device 20, the information regarding each finger is selectively acquired from the second pose information, which is generated based on the image data captured by the camera 21 on the display device 20, and from the first pose information, which is generated based on the information detected by a device mounted to a user's hand. However, the present embodiment is not limited to the above.

For example, as mentioned earlier, when the second pose information is to be generated based on the image data captured by the camera 21 on the display device 20, information regarding the reliability of estimation of the shape of a skeleton model is additionally acquired in some cases. This reliability may then be used together with a parameter a to determine pose information (a value indicative of openness) F regarding a finger as indicated below by weighted averaging from a value Fp and a value Fr. The parameter a approaches the value "1" when the reliability increases, and approaches the value "0" when the reliability decreases. The value Fp is included in the first pose information to express the openness of the finger. The value Fr is included in the second pose information to express the openness of the same finger.

$$F=(1-\alpha)Fp+\alpha \cdot Fr$$

In the above example, it is assumed that the control apparatus 30 computes the parameter a of the associated hand from the information regarding the reliability of each of the left and right hands, and uses the parameter a to determine the pose information (the value indicative of finger openness) F regarding each finger of the associated hand from the above numerical expression.

Further, the parameter a may be corrected based on not only the reliability information but also the position of a hand in the image data captured by the camera 21. For example, in consideration of the fact that the periphery of image data may be affected by the distortion of an optical system of the camera 21, the parameter a of a finger imaged within a predetermined range of the periphery may be decreased to a low-reliability value (the value close to "0" in the present example) for correction purposes.

Other Exemplary Conditions

The foregoing description assumes that the first pose information and the second pose information are combined based on the condition whether or not each finger of the user is imaged and included in the image data captured by the camera 21 on the display device 20. However, the condition used by the present embodiment is not limited to the above one.

For example, the condition determining the mode of combination may include a condition regarding temporal changes between the information regarding the motion of user's fingers detected by the operating device 10 and the information regarding the shape of a user's hand detected based on the image data captured by the camera 21 on the display device 20.

Whether or not the above-mentioned condition is satisfied is determined based, for example, on a statistic (e.g., variance) $\sigma 1$ and a statistic (e.g., variance) $\sigma 2$. The statistic $\sigma 1$ is indicative of dispersion within a past predetermined period of the information regarding the openness of each finger, which is derived from the information detected by the operating device 10. The statistic $\sigma 2$ is indicative of dispersion within a past predetermined period of the information regarding the openness of fingers, which is acquired based on the image data captured by the camera 21 on the display device 20.

Stated differently, if the statistics regarding a certain finger are $\sigma 1 < \sigma 2$, the pose information including an openness value in the first pose information may be outputted with respect to the finger. Meanwhile, if the statistics are $\sigma 1 \geq \sigma 2$, the pose information including an openness value in the second pose information may be outputted with respect to the finger.

In the above example, detection results indicating a fluctuating determination (a frequently changing value) are handled as unreliable ones.

Further, a combination of a plurality of conditions may be used. For example, if a predetermined threshold value is exceeded by a difference between the above-mentioned statistics regarding a certain imaged finger, that is, $\sigma 2 - \sigma 1$, the pose information including an openness value in the first pose information may be outputted with respect to the finger. This corresponds to a case where the determination concerning an imaged finger fluctuates relatively greatly (a frequent value change occurs) so that the results of detection based on the associated captured image data are handled as unreliable ones.

Exemplary Modifications of Hand-Pose Information

Further, the information indicative of the pose of a hand is not limited to the above-described information indicative of finger openness (indicative of the degree to which the joints are bent or extended). The information indicative of the pose of a hand may additionally include, for example, information regarding the orientation of the hand (the normal direction of the palm of the hand) and the orientation of the thumb.

Moreover, in a case where the information indicative of the pose of a hand includes a plurality of elements of information (information regarding, for example, the openness of each finger, the orientation of a hand, the orientation of the thumb), whether to use information elements included in the first pose information or in the second pose information (or what weight is to be applied to the combination of the first pose information and the second pose information) may be determined on an individual information element basis in accordance with predetermined conditions.

As an example, the control apparatus 30 may compare, on an individual information element basis, the statistic (e.g., variance) σ1, which is indicative of dispersion within a past predetermined period of the first pose information, with the statistic (e.g., variance) σ2, which is indicative of dispersion within a past predetermined period of the second pose information acquired based on the image data captured by the camera 21 on the display device 20. If the above statistics regarding a certain information element are σ1<σ2, the control apparatus 30 may output, with respect to the information element, the pose information including the value of the first pose information. Meanwhile, if the statistics are σ1≥σ2, the control apparatus 30 may output, with respect to the information element, the pose information including the value of the second pose information.

In the above example, even when the value of the second pose information is used regarding, for example, the openness of all right-hand fingers, the value of the first pose information is used regarding, for example, the orientation of the hand.

Camera Position

The foregoing description assumes that the camera 21 for capturing image data used as the basis for the second pose information is disposed on the front of the display device 20 as viewed from the user. However, the present embodiment is not limited to such a configuration. The camera 21 may alternatively be disposed on the central or lateral top of the display device 20. Further, the camera need not always move together with the display device 20, but may be disposed in a room where the user is. Furthermore, the number of pieces of the camera is not limited to one. A plurality of pieces of the camera 21 may be disposed.

Moreover, the camera 21 need not always be an optical camera. An alternative is to use a so-called depth camera (a camera that acquires information indicative of the distance to an object) such as a camera that projects infrared radiation to acquire its grayscale image.

Other Examples of Operating Device

The operating device 10 is not limited to the one illustrated above. Any operating device 10 may be used as far as it does not fall when the user opens user's fingers and is able to measure the openness of the user's fingers. For example, the operating device 10 may be a glove that is mounted on a user's hand to measure the openness of each finger (the angle of finger joint bending) with a strain gauge or other similar instrument.

Changes of Display Mode

Further, the present embodiment may not only allow the control apparatus 30 to change the shape of a hand of a virtual character included in image data that is generated based on the pose information regarding a user's hand and outputted to the display device 20, but also allow the control apparatus 30 to vary the display mode of an object in the image data. For example, in a case where the information indicative of the openness of each of the fingers is selected from either the first pose information or the second pose information, the control apparatus 30 may draw the fingers in different modes. That is, the control apparatus 30 may draw one finger in a certain mode after its position in the virtual space is determined based on information selected from the first pose information, and may draw another finger in a different mode after its position in the virtual space is determined based on information selected from the second pose information. More specifically, as regard a finger that is to be drawn after its position in the virtual space is determined based on information selected from the first pose information, the control apparatus 30 may semi-transparency combine (alpha-blend) the image of the finger with the background. As regards a finger that is to be drawn after its position in the virtual space is determined based on information selected from the second pose information, the control apparatus 30 may draw the finger without allowing it to transmit through the background. Furthermore, different display modes may be used, for example, by changing the color of a contour instead of selectively performing or not performing semi-transparency combination.

Reflection in Processing

In a case where the information indicative of the openness of each of the fingers is selected from either the first pose information or the second pose information, the control apparatus 30 according to the present embodiment may use different methods of contact decision (so-called collision decision) when determining whether the fingers are in contact with an object in the virtual space. More specifically, the contact decision (collision decision) method to be applied to a finger drawn after its position in the virtual space is determined based on information selected from the first pose information may be different from the contact decision (collision decision) method to be applied to a finger drawn after its position in the virtual space is determined based on information selected from the second pose information.

Stated differently, in a certain example of the present embodiment, as regards a finger whose position in the virtual space is determined based on a decision result having relatively low accuracy (a finger whose position is determined by the first pose information in the preceding example), the control apparatus 30 may determine that the finger is brought into contact with an object without regard to its shape when the finger comes into contact with the object's circumscribed rectangular parallelepiped.

Further, as regards a finger whose position in the virtual space is determined based on a decision result having relatively high accuracy (a finger whose position is determined by the second pose information in the preceding example), the control apparatus 30 determines that the finger is brought into contact with the object when the finger comes into contact with the object's outer surface.

In the above example, the contact decision method to be applied, for instance, to the contact between an object and a finger not visually recognized by the user (a finger outside the field of view of the camera 21 on the display device 20) is different from the contact decision method to be applied to the contact between an object and a finger visually recognized by the user (a finger within the field of view of the camera 21 on the display device 20). More specifically, a relatively stringent contact decision method is applied to a finger that is visually recognized, whereas a simple contact decision method is applied to a finger that is not visually recognized.

Switching

In an example of the present embodiment, when a finger whose position in the virtual space is determined by the first pose information moves into the field of view of the camera 21, switching may conceivably take place so that the position in the virtual space is determined by the second pose information. In this instance, to prevent the finger from moving in an unnatural manner due to the difference in estimation results, the control apparatus 30 may make adjustments for gradual movement to the currently computed position by performing weighted averaging with a weight changing over time between the previous position and the currently computed position in order to avoid a sudden change if the difference between information regarding, for example, the positions of fingers and hands and the previous positional information is greater than a predetermined threshold value. The above adjustments may be made by using a widely known adjustment processing method.

Detection of Positions of Hands and Others

The control apparatus 30 may generate and output information regarding the position of a user's hand by using both the information detected by the operating device 10 and the image data captured by the camera 21 on the display device 20. More specifically, in a case where the operating device 10 outputs information regarding the angle of the palm of a user's hand relative to the direction of gravity, the control apparatus 30 generates and outputs information regarding the position of the user's hand in the real space (e.g., information regarding the gravity center position of the user's hand in a predetermined coordinate system set within the real space) in accordance with the information regarding the angle of the palm of the user's hand relative to the direction of gravity and with the information regarding the position of the user's hand, which is detected from the image data captured by the camera 21 on the display device 20. Further, the control apparatus 30 generates and outputs information regarding the position in the virtual space that corresponds to the information regarding the gravity center position of the user's hand.

As described above, the present embodiment may generate information regarding, for example, the posture of the user and the position and rotation angle of each joint in addition to the information regarding the pose, for example, of fingers and hands by using both the information detected by the operating device 10 and the image data captured by the camera 21 on the display device 20.

Display of Status

In the present embodiment, the control apparatus 30 may use the image data captured by the camera 21 on the display device 20 in order to notify the user whether or not user's fingers are detected. The notification may be issued by presenting it to the display device 20 or by generating, for example, a sound. Further, when the user mounts a haptic sensation producing device, the control apparatus 30 may issue the notification, for example, by producing a haptic sensation through the device.

Further, the control apparatus 30 may compare the first pose information, which is generated based on the information regarding the motion of user's fingers and received from the operating device 10, with the second pose information, which is generated by using the image data captured by the camera 21 on the display device 20, and issue a notification indicative of whether or not the first pose information and the second pose information coincide with each other.

More specifically, in a case where the first pose information and the second pose information are numerical values indicative, for example, of the openness of each finger, the numerical values may be rounded off (rounded up or down), compared, and checked for coincidence.

Moreover, the foregoing description assumes that the control apparatus 30 generates information regarding the pose of user's fingers. However, instead of the information regarding the pose of the user's fingers, the control apparatus 30 may use information (detected information) regarding the status of feet (e.g., the angles of ankles and the orientation of toes) and information (detected information) regarding the status of a user's body (e.g., posture), which are detected by using a plurality of detection means that differ from each other in the method of detection, generate information indicative of the status of feet and information indicative of the status of the user's body, which are to be outputted, by combining the plurality of acquired pieces of information under predetermined conditions, and output the generated information.

REFERENCE SIGNS LIST

1 Information processing system, 10 Operating device, 11 Grip section, 12 Operating section, 14 Retainer, 15 Sensor section, 16 Button operation section, 17 Finger sensor, 18 Button, 19 Control circuit, 20 Display device, 21 Camera, 30 Control apparatus, 31 Control section, 32 Storage section, 33 Operation reception section, 34 Display control section, 51 Hand image detection section, 52 First pose information generation section, 53 Second pose information generation section, 54 Conditional decision section, 55 Pose information output section, 56 Image data generation processing section.

The invention claimed is:
1. A control apparatus comprising:
reception circuit configured to receive information regarding a motion of user's fingers and information regarding a shape of user's hands, the motion information being provided from a proximity sensor on an operating device adjacent the user's fingers, the shape information being provided from an image including at least one of the user's hands and captured by a camera on a display device;
first pose information generation circuit configured to generate first pose information indicative of a pose of the user's hands in accordance with the received information regarding the motion of the user's fingers;
second pose information generation circuit configured to generate second pose information indicative of a pose of the user's hands in accordance with the received information regarding the shape of the user's hands; and pose information output circuit configured to, for each finger, use the generated first pose information or the generated second pose information in accordance with criteria based on a predetermined condition, to generate and output information indicative of the pose of the user's hands based on the used information; wherein for each finger, the pose information output circuit selects for use either the first pose information or the second pose information, the first pose information being selected for use when the finger is not visible in the image, and the second pose information being selected for use when the finger is visible in the image; and for each finger, the selected pose information is indicative as to whether the finger is extended or bent, and if extended, the degree of extension.

2. The control apparatus according to claim 1, wherein the pose information output circuit is configured to select, under the predetermined condition, either information regarding the motion of user's fingers detected by the first detection apparatus or information regarding the shape of user's hands detected by the second detection apparatus, and generate and output information indicative of the pose of user's hands.

3. The control apparatus according to claim 1, wherein
the control apparatus is connected to a first detection apparatus and to a second detection apparatus, the first detection apparatus being mounted to user's hands and adapted to acquire information regarding the motion of user's fingers, the second detection apparatus being disposed at a different place from the first detection apparatus and adapted to detect the shape of user's hands within a predetermined field of view,
the reception circuit is configured not only to receive information regarding the motion of user's fingers from the first detection apparatus, but also to receive information regarding the shape of user's hands from the second detection apparatus, and
the predetermined condition includes a condition based on whether or not the user's fingers are included within a field of view of the second detection apparatus.

4. The control apparatus according to claim 1, wherein the predetermined condition includes a condition regarding temporal changes between the information regarding the motion of user's fingers and the information regarding the shape of user's hands.

5. The control apparatus according to claim 1, wherein the information indicative of the pose of user's hands includes information indicative of at least one of an orientation of user's hands, an openness of each of user's fingers, and an orientation of user's thumbs.

6. The control apparatus according to claim 1, further comprising:
an image generation circuit configured to generate image information to be presented to the user, wherein
a mode of displaying an image included in the generated image information is varied based on the generated information indicative of the pose of user's hands.

7. An information processing system comprising:
a first detection apparatus that is mounted to user's hands and adapted to acquire information regarding a motion of user's fingers, the motion information being provided from a proximity sensor on an operating device adjacent the user's fingers;
a second detection apparatus that is disposed at a different place from the first detection apparatus and adapted to detect a shape of user's hands within a predetermined field of view, the shape information being provided from an image including at least one of the user's hands and captured by a camera on a display device; and
a control apparatus that is connected to the first detection apparatus and to the second detection apparatus, and adapted to generate
first pose information indicative of a pose of the user's hands in accordance with the information regarding the motion of the user's fingers detected by the first detection apparatus and
second pose information indicative of a pose of the user's hands in accordance with the information regarding the shape of the user's hands detected by the second detection apparatus, and, for each finger, use the generated first pose information or the generated second pose information in accordance with criteria based on a predetermined condition to generate and output information indicative of the pose of the user's hands based on the used information; wherein
for each finger, the control apparatus selects for use either the first pose information or the second pose information, the first pose information being selected for use when the finger is not visible in the image, and the second pose information being selected for use when the finger is visible in the image; and
for each finger, the selected pose information is indicative as to whether the finger is extended or bent, and if extended, the degree of extension.

8. The information processing system according to claim 7, wherein
the first detection apparatus further detects information regarding angles of user's hands relative to a direction of gravity, and
the control apparatus generates and outputs information regarding positions of user's hands in accordance with information detected by the first detection apparatus and with information detected by the second detection apparatus.

9. A control method, comprising:
receiving, by a reception circuit, information regarding a motion of user's fingers and information regarding a shape of user's hands, the motion information being provided from a proximity sensor on an operating device adjacent the user's fingers, the shape information being provided from an image including at least one of the user's hands and captured by a camera on a display device;
generating, by a first pose information generation circuit, first pose information indicative of a pose of the user's hands in accordance with the received information regarding the motion of the user's fingers;
generating, by a second pose information generation circuit, second pose information indicative of a pose of the user's hands in accordance with the received information regarding the shape of the user's fingers; and
for each finger, using, by a pose information output circuit, the generated first pose information or the generated second pose information in accordance with criteria based on a predetermined condition, to generate and output information indicative of the pose of the user's hands based on the used information; wherein
for each finger, the pose information output circuit is configured to select for use either the first pose information or the second pose information, the first pose information being selected for use when the finger is not visible in the image, and the second pose information being selected for use when the finger is visible in the image; and for each finger, the selected pose information is indicative as to whether the finger is extended or bent, and if extended, the degree of extension.

10. A non-transitory, computer readable storage medium containing a computer program, which when executed by a computer, causes the computer to carry out actions, comprising:

receiving information regarding a motion of user's fingers and information regarding a shape of user's hands, the motion information being provided from a proximity sensor on an operating device adjacent the user's fingers, the shape information being provided from an image including at least one of the user's hands and captured by a camera on a display device;

generating first pose information indicative of a pose of the user's hands in accordance with the received information regarding the motion of the user's fingers;

generating second pose information indicative of a pose of the user's hands in accordance with the received information regarding the shape of the user's hands; and for each finger, using the generated first pose information or the generated second pose information in accordance with criteria based on a predetermined condition to generate and output information indicative of the pose of the user's hands based on the used information; wherein for each finger, selected for use is either the first pose information or the second pose information, the first pose information being selected for use when the finger is not visible in the image, and the second pose information being selected for use when the finger is visible in the image; and for each finger, the selected pose information is indicative as to whether the finger is extended or bent, and if extended, the degree of extension.

\* \* \* \* \*